(12) United States Patent
Fan et al.

(10) Patent No.: US 7,187,805 B1
(45) Date of Patent: Mar. 6, 2007

(54) MAXIMUM LIKELIHOOD ESTIMATION OF JPEG QUANTIZATION VALUES

(75) Inventors: Zhigang Fan, Webster, NY (US); Ricardo L. de Queiroz, Pittsford, NY (US)

(73) Assignee: Xerox Corporation, Stamford, CT (US)

( * ) Notice: Subject to any disclaimer, the term of this patent is extended or adjusted under 35 U.S.C. 154(b) by 791 days.

(21) Appl. No.: 09/447,554

(22) Filed: Nov. 23, 1999

(51) Int. Cl.
*G06K 9/36* (2006.01)
(52) U.S. Cl. .................................... 382/251
(58) Field of Classification Search ............... 382/232, 382/251; 375/240.01–240.12
See application file for complete search history.

(56) References Cited

U.S. PATENT DOCUMENTS

| | | | | |
|---|---|---|---|---|
| 5,150,433 A | * | 9/1992 | Daly | |
| 5,434,623 A | * | 7/1995 | Coleman et al. | 375/240.4 |
| 5,719,843 A | * | 2/1998 | Nakajima et al. | 369/59 |
| 6,011,868 A | * | 1/2000 | Christian et al. | 382/233 |
| 6,064,324 A | * | 5/2000 | Shimizu et al. | 341/50 |
| 6,134,280 A | * | 10/2000 | Matui | 375/341 |

OTHER PUBLICATIONS

Yovanof et al. "Statistical analysis of the DCT coefficients and their quantization error" Thirtieth Asilomar Conference on signals Systems and Computers, 1996, vol. 1, pp. 601-605, Nov. 1995.*
Price et al. "Biased reconstruction for JPEG decoding" IEEE signal Processing Letters, pp. 297-299, Dec. 1999.*
R.L. De Queiroz, "Processing Jpeg-Compressed Images and Documents," IEEE Transactions on Image Processing, vol. 7, No. 12, Dec. 1998, pp. 1661-1672.
M.-Y. Shen et al., "Reviewing of Postprocessing Techniques for Compression Artifact Removal," Journal of Visual Communication and Image Representation, vol. 9, No. 1, Mar. 1998, pp. 2-14.

* cited by examiner

*Primary Examiner*—Jingge Wu
(74) *Attorney, Agent, or Firm*—Oliff & Berridge, PLC

(57) ABSTRACT

This invention is a method and apparatus for processing decompressed images. More particularly, this invention relates to methods and apparatus which process images without requiring information on whether the image was previously compressed or how the image was compressed. Quantization values of each image block of a decompressed image are determined a compression method used to compress a decompressed image to be processed is identified. The method and apparatus of this invention is particularly useful to determine if a decompressed image was previously compressed using a JPEG compression technique by retrieving DCT coefficients and determining quantization values to determine original DCT coefficients of a compressed and decompressed image.

22 Claims, 5 Drawing Sheets

MAXIMUM LIKELIHOOD ESTIMATION OF JPEG QUANTIZATION VALUES

BACKGROUND OF THE INVENTION

1. Field of Invention

This invention generally relates to processing decompressed digital images compressed using a quantizing compression technique.

2. Description of Related Art

Data compression is required in data handling processes, where too much data is present for practical applications using the data. Commonly, compression is used in communication links to reduce the transmission time or required bandwidth. Similarly, compression is preferred in image storage systems, including digital printers and copiers, where "pages" of a document to be printed are stored temporarily in precollation memory. The amount of media space on which the image data is stored can be substantially reduced with compression. Generally speaking, scanned images, i.e., electronic representations of hard copy documents, are often large, and thus make desirable candidates for compression.

The image compression standard disseminated by the Joint Photographic Experts Group (JPEG) committee is a compression technique which reduces data redundancies based on pixel-to-pixel correlations. Generally, a photographic image does not change very much on a pixel-to-pixel basis and therefore has what is known as "natural spatial correlation." In natural scenes, correlation is generalized, but not exact. Noise makes each pixel somewhat different from its neighbors.

SUMMARY OF THE INVENTION

The methods and apparatus of this invention seek to enhance conventional methods for processing decompressed images. In a conventional method for processing images, an image source provides the compressed image data to the system. The image source can be an input device such as a camera or scanner, a transmission channel or a storage device. The compressed image data is input to a decompression unit that decompresses the image data to reconstruct the image. The decompressed image is sent to an image processing system that processes the decompressed image.

In processing decompressed images, such as decompressed JPEG-compressed images, for example, a quantization table is often required. However, the quantization information is often not available to the image processing system, especially when the image is decompressed remotely. In particular, if the image was decompressed apart from the image processing, the image processing system might not have available information indicating that the image has been JPEG compressed, for example, or information identifying or defining the quantization table(s) used to compress the image.

This invention provides systems and methods that process images without requiring information on whether the image was previously compressed or how the image was compressed.

This invention provides systems and methods that determine quantization values of one or more image blocks of a decompressed image.

This invention separately provides systems and methods that are able to identify a compression method used to compress a decompressed image to be processed.

The systems and methods of this invention are particularly useful to determine if a decompressed image was previously compressed at least in part using a JPEG compression technique.

This invention separately provides systems and methods useable to process a JPEG compressed digital image.

These and other features and advantages of this invention are described in or are apparent from the following detailed description of the various exemplary embodiments.

BRIEF DESCRIPTION OF THE DRAWINGS

The preferred embodiments of this invention will be described in detail, with reference to the following figures, wherein.

DETAILED DESCRIPTION OF PREFERRED EMBODIMENTS

Figure 1:
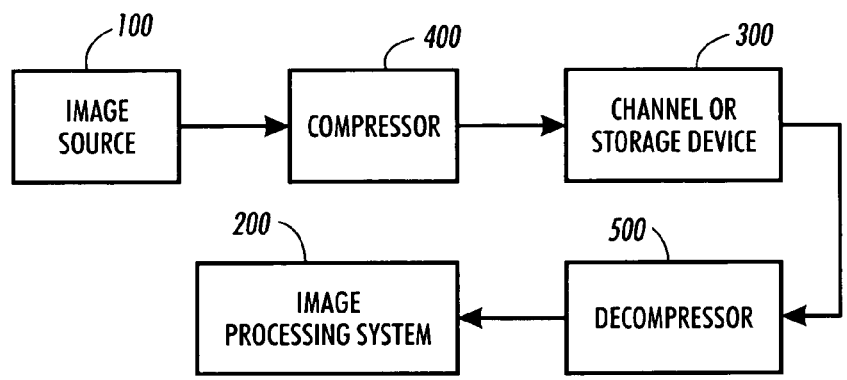
FIG. 1 is a generalized functional block diagram of one exemplary embodiment of a system including an image processing system according to this invention.

The systems and methods of this invention identify a compression method of a decompressed image. In processing decompressed images compressed using a quantizing compression technique, because often only the decompressed image data is input to the image processing system, the quantization table and/or other data related to the compressed data are not available to the image processing system.

In one exemplary embodiment of the systems and methods of this invention, the decompressed image is analyzed to determine whether the decompressed image was JPEG compressed. A quantization table, as further described below, is obtained during image processing. Upon image processing, the quantization table is regenerated by determining the maximum likelihood of the quantization table values. To determine the regenerated quantization table, the DCT coefficients of the re-compressed image are determined, using a processor to process the decompressed image data using JPEG compression techniques. Thus, image processing can be performed even if the quantization information might not be available or the image was decompressed remotely from the compression system.

The Discrete Cosine Transform (DCT) is central to a JPEG compression process performed on the image data. For example, when a Discrete Cosine Transform is performed on values for a block of image data, such as an 8×8 pixel block of image data, for example, the result is a set of 64 DCT coefficients. The DCT coefficients represent the amplitudes of 64 respective orthogonal waveform components that together define the values for all 64 pixels in the 8×8 pixel block. An inverse Discrete Cosine Transform performed on the 64 coefficients will reproduce the original 8×8 pixel block values.

The advantage of using these 64 coefficients instead of the 64 original image values is that each coefficient provides the magnitude of an orthogonal waveform representing a different spatial frequency. Smooth textured blocks have low pixel-to-pixel variation. Thus, many zero-value "high-frequency" DCT coefficients are likely. For example, performing a Discrete Cosine Transform on a block of 64 pixels having identical values will result in one nonzero coefficient and 63 zero value coefficients. Further, if the coefficients are ordered by spatial frequency, long strings of zero-value coefficients will result.

One advantage of using data with long zero-value strings is obtaining greater data compression, for example, when using run-length encoding and/or entropy encoding such as Huffman-type encoding. For this reason, when a Discrete Cosine Transform is determined for a pixel block, it is desirable to represent the coefficient for high spatial frequencies with less precision. This representation is done by a process called quantization. Quantization is basically a process for reducing the precision of the DCT coefficients. Precision reduction is extremely important, since lower precision almost always implies a lower bit rate in compression.

A DCT coefficient is quantized by being divided by a nonzero positive integer called a quantization value, and truncating or rounding the quotient, or the quantized DCT coefficient, to the nearest lower integer. In order to reconstruct or dequantize the DCT coefficient, the quantized DCT coefficient is multiplied by the quantization value. Since some precision is lost in quantizing, the reconstructed DCT coefficients are approximations of the values before quantization.

The original DCT coefficients for image data blocks are not recoverable. They are best approximated by the dequantized values {Y(m,n)}. {Y(m,n)} are retrieved as multiples of the quantization values from the quantization table. In other words the dequantized DCT coefficients Y(m,n) can be expressed as k·q(m,n), where q(m,n) is the (m,n) entry of the quantization table, and k is an integer. In inverse Discrete Cosine Transform processing, the dequantized DCT coefficient {Y(m,n)} is transformed to produce the decompressed image block {y(i,j)}.

As discussed above, inverse Discrete Cosine Transform processing is theoretically reversible with Discrete Cosine Transform. In other words, a Discrete Cosine Transform of {y(i,j)} would produce exactly {Y(m,n)}. However, in practice, the Discrete Cosine Transform only generates {Y*(m,n)}, which is an approximated version of {Y(m,n)}. Common sources of errors may include, but are not limited to the pixel value of the decoded image block y(i,j), which is typically an integer, being rounded from a real number; the decoded image block y(i,j), which may be a number greater than 255 or smaller than 0, being truncated to 255 or 0, respectively; or transforms being determined with limited accuracy. In the methods and systems of this invention, at least the rounding error is determined and used in determining the maximum likelihood of the quantization values.

Since blocks with uniform intensity and blocks with truncation are treated separately in estimation, those blocks that are analyzed using the systems and methods of this invention should be non-uniform and should not have been truncated. For those blocks, a likelihood function can be established as:

$$L(q) = \Sigma_s \log \{p[Y_s^*(m,n);q]\}, \quad (1)$$

where:
s is the s-th block in the estimation.
The probability function for each block is:

$$p[Y^*(m,n); q(m,n)] = p_Y[r(m,n) \; q(m,n)] \; \Sigma_k p_X[Y^*(m,n) | kq(m,n)]. \quad (2)$$

where:
$p_Y[.]$ is a Gaussian or Laplacian distribution for (m,n)=0, or (m,n)≠0, respectively,
$P_X[.]$ is a Gaussian distribution, and $$r(m,n) = \text{round}\,[Y^*(m,n)/q(m,n)]. \quad (3)$$

The summation is over a range of all integers k such that:

$$|Y^*(m,n) - kq(m,n)| \leq D(m)D(n). \quad (4)$$

where D(.) is a function defined to be:

$$D(x) = 2; \qquad \text{for } x = 0 \text{ or } 4, \quad (5)$$
$$\phantom{D(x) =} 2\cos \pi/4; \qquad \text{for } x = 2 \text{ or } 6,$$
$$\phantom{D(x) =} 2\cos \pi/4 \cos \pi/8; \quad \text{for } x \text{ odd}.$$

Accordingly, the maximum likelihood estimation q*(m,n) of the quantization value q(m,n) in the quantization table regenerated using the systems and methods of this invention is determined as:

$$q^*(m,n) = \arg\max_q L(q) \quad (6)$$
$$= \arg\max_q \{\sum_{s} \log \{\sum_{k} p[Y_s^*(m,n) | k\,q]\} -$$
$$N\log[\sigma^*(m,n)]\},$$

where:
N is the total number of blocks used in estimation; and
ρ* (m,n) is the estimation of parameter for Gaussian distribution.

Specifically, $$\sigma^*(m,n) = \left[\sum_{s} r_s^2(m,n)/N\right]^{1/2}, \quad \text{for } (m,n) = (0,0); \quad (7)$$
$$\sigma^*(m,n) = \sum_{s} |r_s(m,n)|/N, \quad \text{for } (m,n) \neq (0,0).$$

In one exemplary embodiment of the systems and methods of this invention, to reduce computation, each re-compressed DCT coefficient {Y*(m,n)} is rounded to an integer, which can be denoted as {Y'(m,n)}. The maximum likelihood estimation q*(m,n) can be shown as:

$$q^*(m,n) = \arg\max_q \{\sum_{s} \log \{\sum_{k} p[Y_s^*(m,n) | k\,q]\} - \quad (8)$$
$$N\log[\sigma^*(m,n)]\}$$
$$= \arg\max_q \sum_{i} N(i)\log P_d(i;q) +$$
$$N\log[\sigma^*(m,n)],$$

where:
  N is the total number of blocks used in estimation; and
  N(i) is the number of blocks, such that:

$$|Y's\ (m,n) - qr_s(m,n)| = i;\ \text{and} \quad (9)$$

$P_d(i;q)$ is the probability conditioned satisfied by Eg. 9.
  In particular, $P_d(i; q)$ can be determined as $$P_d(i;\ q) = \Sigma_j I(i+jq),\ \text{and} \quad (10)$$

$$I(i) = \int (6/\pi^{1/2}\ \exp[-6x^2]dx, \quad (11)$$

where the integral limits are from i−0.5 to i+0.5.

In one exemplary embodiment of the systems and methods of this invention, to further reduce the resources necessary to determine the quantization to table(s), not all the values are tested in estimating the maximum likelihood. In building a histogram for the rounded re-compressed DCT coefficient Y' (m,n), normally, the highest peak outside the main lobe (0 and its vicinity) corresponds to the quantization value q(m,n) or one of its multiples. According to this exemplary embodiment, the search is restricted to be the values Q, Q+1, and Q−1 and their integer fractions, where Q is the highest peak outside the main lobe. Thus, according to this exemplary embodiment, the search is restricted to the highest peak outside the main lobe and the two adjacent levels.

The image processing of a decompressed image can be performed by:

1) For each image block, determine the maximum and the minimum values of the block. If the maximum value is 255 or the minimum value is 0, the block may contain truncated pixels. If the maximum value is equal to the minimum value, the block is uniform. Both kinds of blocks need to be excluded from further processing to avoid introducing unnecessary errors.

2) A Discrete Cosine Transform is performed for each block not excluded in step 1). The results are rounded to integers as {Y'(m,n)}.

3) For each DCT coefficient (m,n), steps 4–15 are performed.

4) A histogram h is built from the rounded block value {|Y' (m,n)|}.

5) An index with the highest count in the histogram is determined for indices greater than 4. The highest count index is denoted as Q. This is the highest peak outside the main lobe. If the highest count is 0, the quantization value q(m,n) cannot be determined, and control returns to step 3.

6) The maximum likelihood value is initiated as max_likelihood

FIG. 1 shows a generalized functional block diagram of a system 100 that includes an image processing system 200 according to this invention. The system 100 can include an image source 110 that may be any one of a number of different sources, such as a scanner, a digital copier or a facsimile device suitable for generating electronic image data, or a device suitable for storing and/or transmitting the electronic image data, such as a client or a server of a network. The electronic image data from the image source 110 is provided to a compressor 400 of the system 100.

In particular, in various exemplary embodiments, the compressor 400 compresses the image using various compression operations associated with the JPEG compression standard to compress the image data within a block. However it should be appreciated any known or later developed compression technique that compresses and quantifies the image data on a block-by-block basis is equally relevant to the image processing systems and methods of this invention. In the compressor 400, the data may be operated on in any of a number of well-known bit- or byte-wise operations to accomplish the compression of the image data, wherein additional information is used and/or generated (such as a dynamically adjusted quantization table) as the image is compressed.

Once compressed, the compressed image data then is transferred to the channel or storage device 300. The channel or storage device 300 can be either or both of a channel device for transmitting the compressed image data to the decoder 500 or a storage device for indefinitely storing the compressed image data until there arises a need to decompress the compressed image data. The channel device can be any known structure or apparatus for transmitting the compressed image data from a first apparatus implementing the compressor 400 according to this invention to a physically remote decompressor 500 according to this invention. Thus, the channel device can be a public switched telephone network, a local or wide area network, an intranet, the Internet, a wireless transmission channel, any other distributed network, or the like.

Similarly, the storage device can be any known structure or apparatus for indefinitely storing compressed image data, such as a RAM, a hard drive and disk, a floppy drive and disk, an optical drive and disk, flash memory or the like. Moreover, the storage device can be physically remote from the encoder 400 and/or the decoder 500, and reachable over the channel device described above.

= −∞
  7) For Q1 = Q−1, Q, and Q+1, i.e. for the highest peak outside the main lobe and the two adjacent levels:
    8) For each value of x, to initially estimate q = Q1/x,
      where x = 1, 2, . . ., Q1:
      9) If q is an integer, then
        10) For z = q−1, q−2, . . ., 0:
          11) Calculate the number of blocks N(z) = $\Sigma_j$ h(z + j q).
          12) If z > M and q−z > M and N(z) > 0, where M
              = min {q−1, round[D(m)D(n)]},
              then return to step 8 for next q.
        13) Calculate likelihood = $\Sigma_i$ N(i) log $P_d$(i) + N log σ*.
        14) If likelihood > max_likelihood, then set max_likelihood
            = likelihood and Est_q = q.
  15) The maximum likelihood estimation, MLE, of q(m,n) is given as Est_q.

The compressed image data is then processed by the decompressor 500. The decompressor 500 receives the compressed image data from the channel or storage device 300 and recombines the blocks of decompressed image data in their corresponding position. Though the compressor 400 and the decompressor 500 are each shown in FIG. 1 as physically separate from the image processing system 200, it should be understood that the decompressor 500, and/or the compressor 400 may be different aspects, with the image processing system 200, of a single physical device. The decompressor 500 sends the reconstructed image to the image processing system 200.

Figure 2:
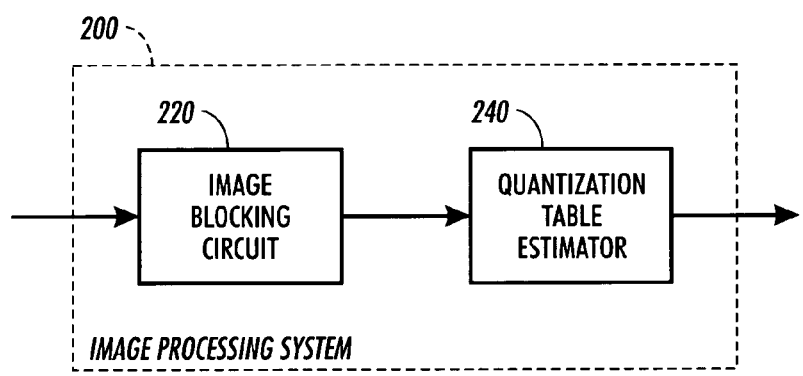
FIG. 2 shows a generalized functional block diagram of one exemplary embodiment of the image output device of FIG. 1 according to this invention.

FIG. 2 shows a generalized functional block diagram of one exemplary embodiment of the image processing system 200 according to this invention. The following description of the image processing system 200 assumes the image to be processed was compressed using a JPEG compression technique. It will be apparent to those of ordinary skill in the art, from the following description of the image processing system 200, how to modify the image processing system 200 to deal with other compression techniques to perform the image processing according to this invention. Thus, because such modifications are readily apparent and predictable from the following discussion of the image processing system 200, additional descriptions of other compression techniques' implementations are not necessary and are thus omitted.

The image processing system 200 includes an image blocking portion 220, a quantization table estimator 240 and an image processor 260. The image blocking portion 220 divides the decompressed image data into a plurality of M×M blocks or segments. The quantization table estimator 240 inputs the M×M blocks of image data and outputs one or more estimated quantization tables for the blocks to the image processor 260. The image processor processes the decompressed image data based on the one or more estimated quantization tables.

Figure 3:
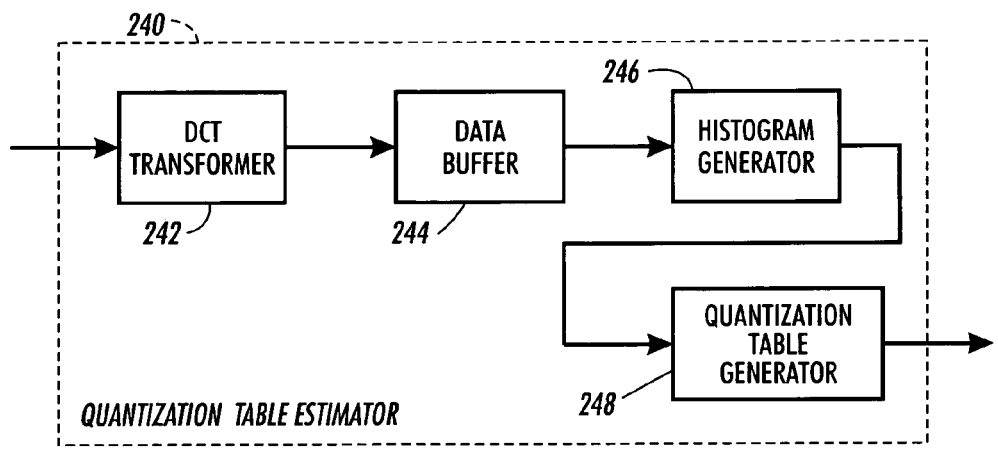
FIG. 3 shows a generalized functional block diagram of one exemplary embodiment of the quantization table estimator of FIG. 2 according to this invention.

FIG. 3 shows a generalized functional block diagram of one exemplary embodiment of the quantization table estimator 240. In the quantization table estimator 240, a Discrete Cosine Transform is performed on the M×M blocks of image data in a DCT transformer 242. A data buffer 244 inputs and stores the transformed data. A histogram generator 246 inputs the transformed image data from the data buffer 244 and generates a histogram on the image data. An estimated quantization table generator 248 inputs the image data from the histogram generator 246 and generates one or more estimated quantization tables for the M×M blocks of image data.

In operation, the data buffer 244 stores the minimum and maximum values of the compressed image blocks. The histogram generator 246 generates a histogram entry in a histogram for the block for each rounded block value. The quantization table generator 248 generates the quantization table by obtaining the maximum likelihood estimation of the quantization table.

Figure 4:
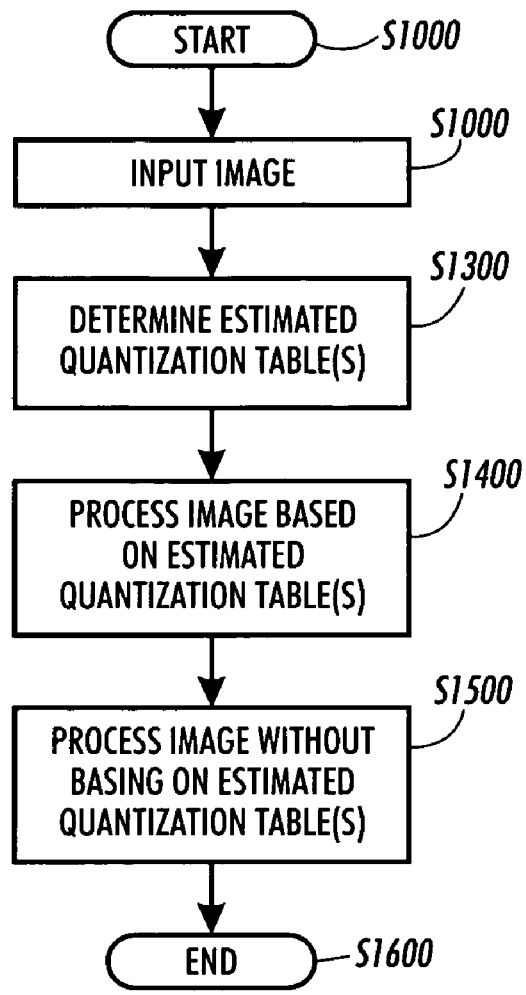
FIG. 4 is a flowchart outlining an image processing method in accordance with this invention.

FIG. 4 is a flowchart outlining one embodiment of an image processing method in accordance with this invention. Beginning in step S1000, control continues to step S1100, where the decompressed image data is input. Next, in step S1200, one or more estimated quantization tables are determined from the decompressed image data. Then, in step S1400, the decompressed image is processed based, at least in part, on the one or more estimated quantization tables. For example, the decompressed image data can be processed to remove compression artifacts based on the determined quantization table(s). It should be appreciated that, in step S1400, the image can be further processed based on any desired image processing technique. Control then continues to step S1500.

In step S1500, the image is further processed. This further processing generally will not use the estimated quantization table(s). It should be appreciated that, even though FIG. 4 shows step S1400 and step S1500 as two separate steps, the image processing with and without the estimated quantization table(s) may be combined into one single step. Control then continues to step S1600, where the control routine ends.

Figure 5:
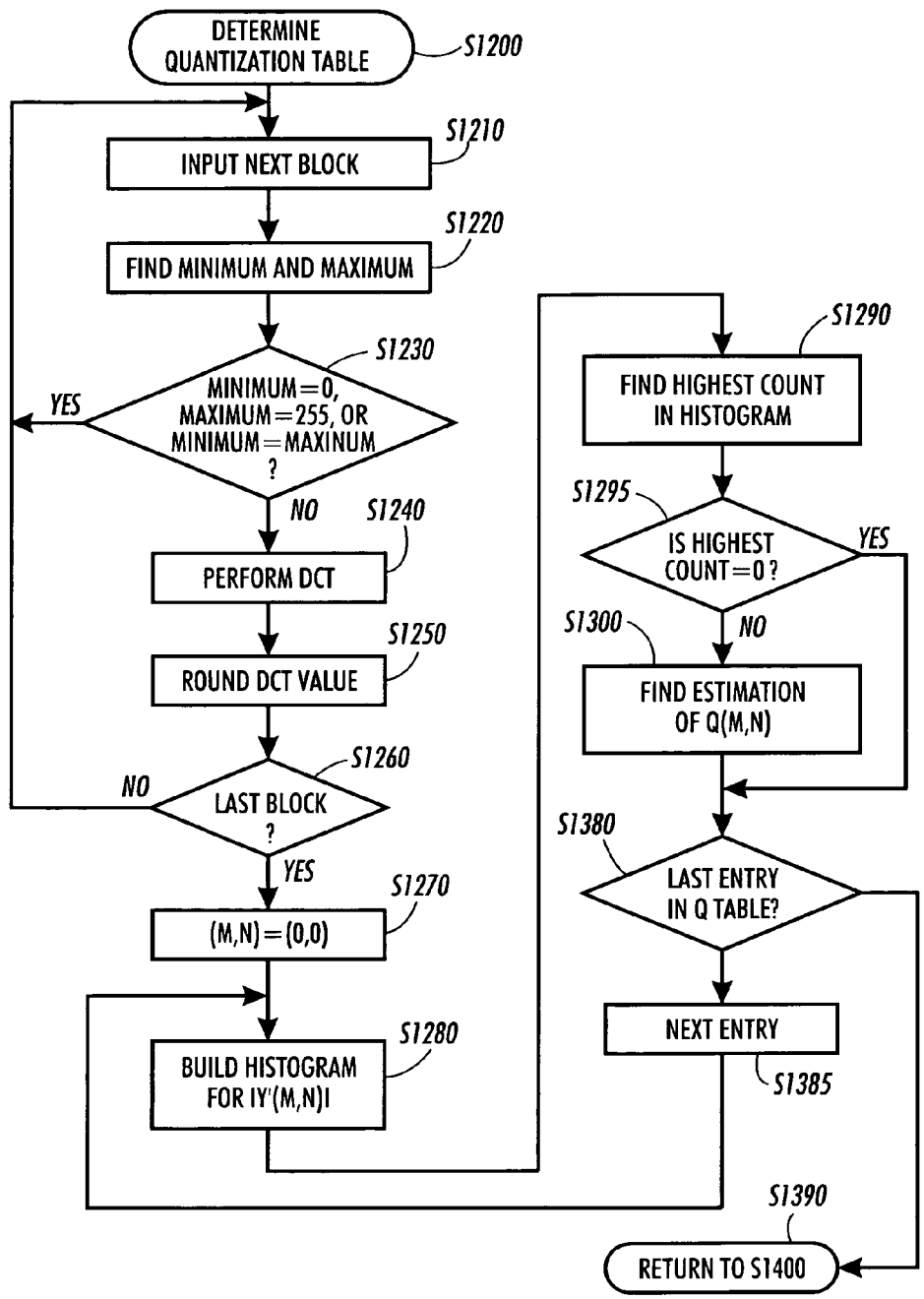
FIG. 5 is a flowchart outlining in greater detail one exemplary embodiment for determining a quantization table of FIG. 4.

FIG. 5 outlines in greater detail one exemplary embodiment of a method for determining the quantization table of step S1200. Beginning in step S1200, control continues to step S1210, where the next block of compressed image data is input as the current block. Next, in step S1220, the minimum value and maximum value of the current block are determined. Control then continues to step S1230.

In step S1230, a determination is made whether the minimum value is equal to 0, the maximum value is equal to 255, and/or the minimum and the maximum value are equal to each other. If so, the current block may contain truncated pixels or the block is uniform. Accordingly, this current block should not be analyzed. Control thus returns to step S1210. Otherwise, the current block is not excluded from analysis. Control therefore continues to step S1240.

In other words, if the maximum value is 255 or the minimum value is 0, the block may contain truncated values. If the maximum value is equal to the minimum value, the block is uniform. Both truncated and uniform blocks should be excluded from further processing.

In step S1240, a Discrete Cosine Transform is performed on each block. Next, in step S1250, each of the DCT values is rounded to an integer as {Y'(m,n)}. Control then continues to step S1260.

In step S1260, a determination is made whether the current block is the last block in the image. If so, control continues to step S1270. Otherwise, control returns to step S1210.

In step S1270, the current DCT entry (m,n) is initialized as (0,0). Then, in step S1280, a histogram for the absolute value of the rounded DCT value {|Y'(m,n)|} is built. An exemplary embodiment of the implementation of a histogram is disclosed in copending application Ser. No. 09/143,551 and now U.S. Pat. No. 6,308,179 incorporated herein by reference in its entirety. Next, in step S1290, the highest count Q in the histogram is determined. As discussed above, the search is restricted to the highest peak and the two adjacent levels. Then, in step S1295, a determination is made whether the highest count is greater than zero. If the highest count is zero, the quantization value is unknown. Thus, control jumps to step S1380. Else, control continues to step S1300.

In step S1300, the maximum likelihood estimation of the quantization value q(m,n) is determined. Then in step S1380, a determination is made whether (m,n) is the last entry in quantization table. If not, control continues to step S1385. Otherwise, control jumps to step S1390 where control returns to step S1400.

In step S1385, the current entry is set to the next entry, and the control returns to step S1280.

Figure 6:
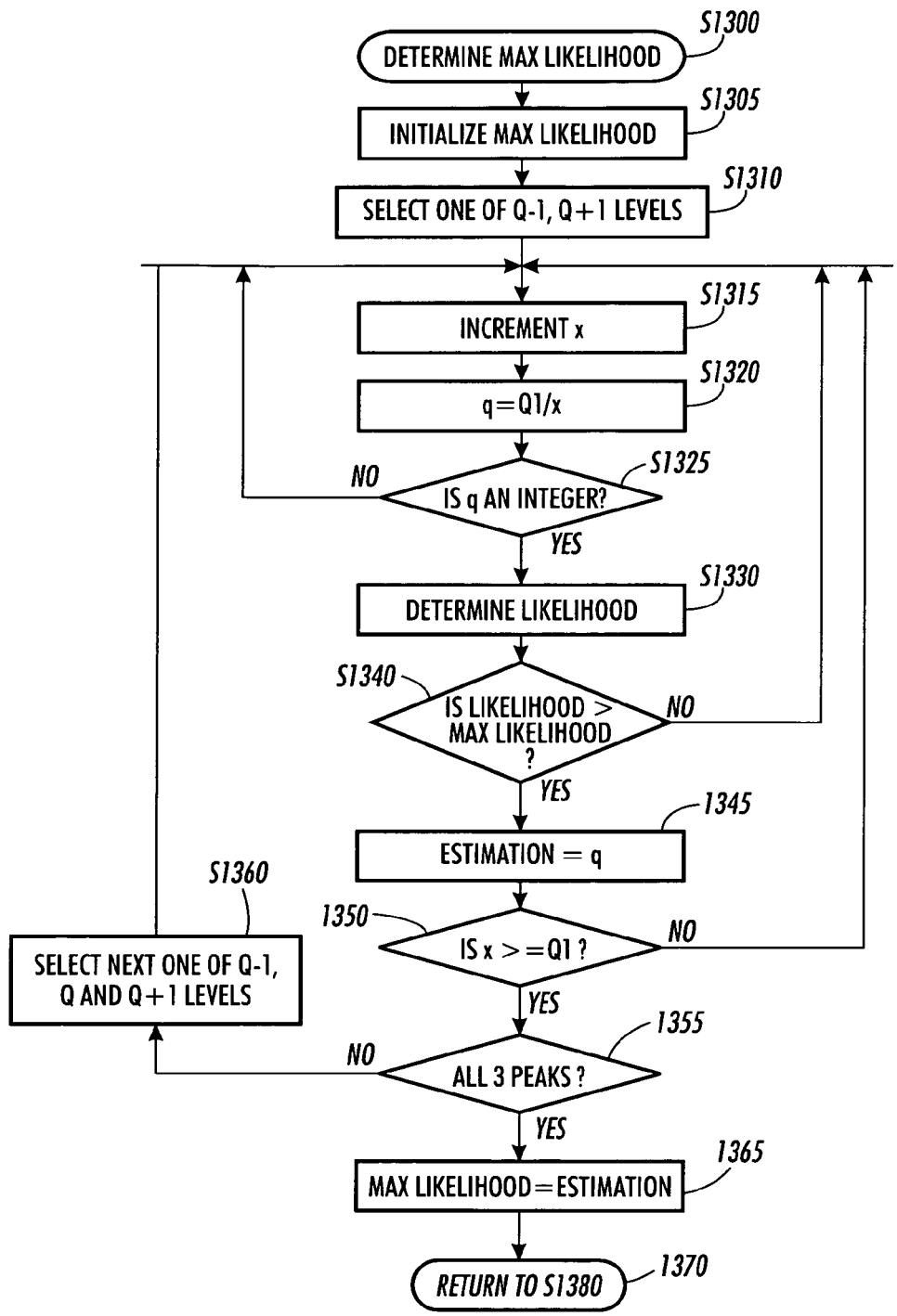
FIG. 6 is a flowchart outlining in greater detail one exemplary embodiment for determining a maximum likelihood estimation of FIG. 5.

FIG. 6 outlines in greater detail one exemplary embodiment of a method for determining the maximum likelihood of step S1300.

Beginning in step S1300, control continues to step S1305, where the maximum likelihood is initialized to negative infinity. Next, in step S1310, the next level of the Q−1, Q and Q+1 levels is input as the current level Q1, i.e. the current level Q1 is one of the three levels Q−1, Q and Q+1, where Q is the level having the highest peak outside the main lobe. As discussed above, the search is restricted to only the Q−1, Q and Q+1 levels. Control then continues to step S1315.

In step S1315, the next value x of an index counter is input, where x is between 1 and Q1. That is, the estimation is performed up to the current level Q1. Then, in step S1320, the initial estimation q is initialized as Q1/x. Next, in step S1325, a determination is made whether q is an integer. If so, control continues to step S1330. Else, control returns to S1315.

In step S1330, the likelihood is determined. Then, in step S1340, a determination is made whether the determined likelihood is greater than the current maximum likelihood. If not, then the determined likelihood is not the maximum likelihood. Control thus returns to step S1315. Else, control continues to step S1345.

In step S11345, the estimation value is set as the estimation q. Then, in step S1350, a determination is made whether x is greater than or equal to Q1. If not, control returns to step S1315. Else, the peak Q1 is reached and control continues to step S1355.

In step S1355, a determination is made whether all three levels have been searched. If not, control continues to step S1360. Else, control jumps to step S1365. Then, in step S1360, Q1 is incremented to the next level. Control then returns to step S1315.

In contrast, in step S1365, the maximum likelihood value is set to the estimation value. Control then continues to step S1370, where control returns to step S1380.

Figure 7:
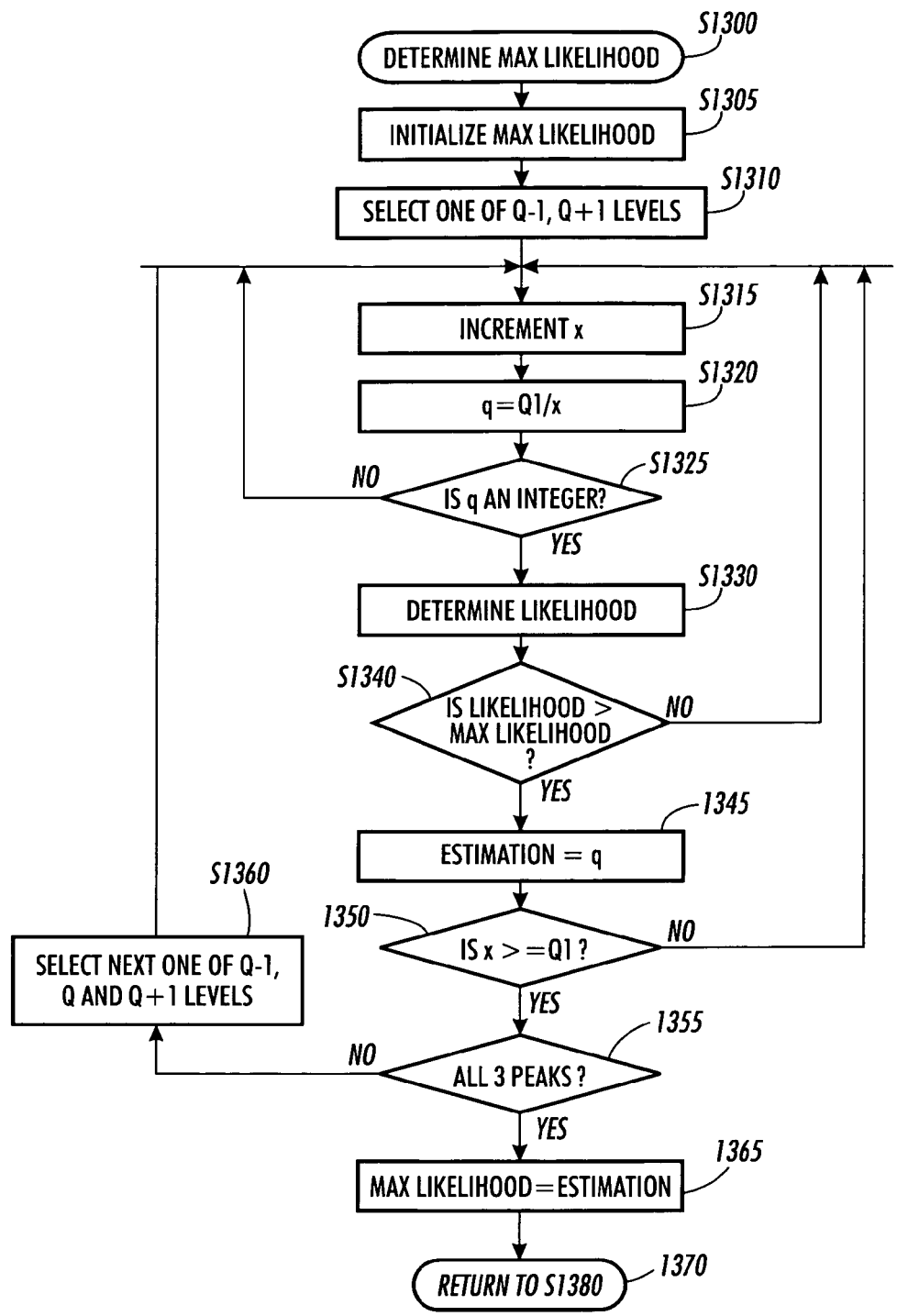
FIG. 7 is a flowchart outlining in greater detail one exemplary embodiment for determining the likelihood of FIG. 6.

FIG. 7 outlines in greater detail one exemplary embodiment of the likelihood determination step S1330 when q is an integer.

Beginning in step S1330, control continues to step S1331, where the next counter z is set to q. Next, in step S1332, z is decremented. That is, the estimation of the parameter is performed with values less than q, i.e., q−1 down to 0. Control then continues to step S1333.

In step S1333, the number of blocks N(z) is calculated from the histogram h as $\Sigma_j$ h(z+jq). Then, in step 1334, M is determined as min {q−1, round[D(m)D(n)]}. Next, in step S1335, a determination is made whether z>M and q−z>M and N(z)>0. If so, control returns to step S1331. Else, control continues to step S1336.

In step S1336, the likelihood is calculated as $\Sigma_i$(i) log Pd(i)+N log σ*. Then in step S1337, a determination is made whether z is equal to zero, i.e., that all values less than q have been analyzed. If not, control returns to step S1332. Otherwise, control continues to step S1338 where control returns to step S1340.

As shown in FIG. 1, the image processing system 200 is preferably implemented on a programmed general purpose computer. However, the image processing system 200 can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing steps S1000—S1600 of FIGS. 4–7 can be used to implement the image processing system.

This invention has been described in connection with the preferred embodiments. However it should be understood that there is no intent to limit the invention to the embodiments described above. On the contrary, the intent to cover all alternatives, modification, and equivalents as may be included within the spirit and scope of the invention.

What is claimed is:

1. A method for processing decompressed image data, comprising:
    receiving decompressed image data;
    creating an estimated quantization table from the received decompressed image data;
    processing the decompressed image data based on the created estimated quantization table to form processed electronic image data.

2. The method of claim 1, further comprising further processing of the decompressed image data without using the created quantization table.

3. The method of claim 1, wherein creating the estimated quantization table comprises creating the estimated quantization table based on at least one maximum likelihood estimation.

4. The method of claim 3, further comprising generating the at least one maximum likelihood estimation based on a probability function.

5. The method of claim 3, further comprising generating the at least one maximum likelihood estimation based on a Gaussian distribution.

6. The method of claim 1, wherein the decompressed data comprises image data blocks, and creating the estimated quantization table comprises:
    determining, for each block, if that block has at least one of truncated image data values or uniform image data values; and
    excluding any block having at least one of truncated image data values or uniform image data values.

7. The method of claim 1, wherein creating the estimated quantization table further comprises generating transformed image data from the decompressed image data using a discrete cosine transform.

8. The method of claim 7, wherein creating the estimated quantization table further comprises generating a histogram from the transformed image data.

9. The method of claim 8, wherein creating the quantization table comprises:
    identifying a level of a main lobe of the histogram having a highest peak and two adjacent levels of the histogram adjacent to the identified level; and
    creating the quantization table based only on the identified and adjacent levels of the histogram.

10. The method of claim 8, wherein creating the estimated quantization table further comprises rounding each DCT coefficient of the transformed image data.

11. A system for processing decompressed image data, comprising:
    a receiver that receives decompressed image data;
    a quantization table estimator that creates an estimated quantization table from the received decompressed image data; and
    a processor that processes the decompressed image data based on the created estimated quantization table to form processed electronic image data.

12. The system of claim 11, wherein the processor further processes the decompressed image data without using the created quantization table.

13. The system of claim 11, wherein the quantization table estimator creates the estimated quantization table based on at least one maximum likelihood estimation.

14. The system of claim 13, further comprising a maximum likelihood estimator that generates the at least one maximum likelihood estimation based on a probability function.

15. The system of claim 13, further comprising a maximum likelihood estimator that generates the at least one maximum likelihood estimation based on a Gaussian distribution.

16. The system of claim 11, wherein:
the decompressed data comprises image data blocks: and
the quantization table estimator comprises a block analyzer that determines, for each block, if that block has one of truncated image data values or uniform image data values, wherein the quantization table estimator excludes any block having at least one of truncated image data values or uniform image data values.

17. The system of claim 11, wherein the quantization table estimator further comprises a DCT transformer that generates transformed image data from the decompressed image data using a discrete cosine transform.

18. The system of claim 17, wherein the quantization table estimator further comprises a histogram generator that generates a histogram from the transformed image data.

19. The system of claim 18, wherein:
the quantization table estimator further comprises a peak identifier that identifies a level of a main lobe of the histogram having a highest peak and two adjacent levels of the histogram adjacent to the identified level; and
the quantization table estimator creates the quantization table based only on the identified and adjacent levels of the histogram.

20. The system of claim 18, wherein the quantization table estimator further comprises a coefficient rounding circuit that rounds each DCT coefficient of the transformed image data.

21. The method of claim 1, wherein creating an estimated quantization table from the received decompressed image comprises creating an estimated quantization table from the received decompressed image without having an original quantization table that was used to compress the received decompressed image.

22. The system of claim 11, wherein the quantization table estimator creates an estimated quantization table from the received decompressed image without having an original quantization table that was used to compress the received decompressed image.

* * * * *